United States Patent [19]

Kooker

[11] 3,999,322
[45] Dec. 28, 1976

[54] ICE FISHING HOLE PLUG
[76] Inventor: Earl F. Kooker, 724 Fairway, Spencer, Iowa 51301
[22] Filed: Oct. 31, 1975
[21] Appl. No.: 627,618
[52] U.S. Cl. .................................. 43/4; 62/66; 249/65
[51] Int. Cl.² ................................... A01K 97/00
[58] Field of Search ............... 43/4; 249/65; 62/66
[56] References Cited
UNITED STATES PATENTS

| | | | |
|---|---|---|---|
| 2,799,146 | 7/1957 | Meagher | 43/4 X |
| 2,914,926 | 12/1959 | Meagher | 43/4 X |
| 3,555,827 | 1/1971 | Herr | 43/4 X |
| 3,813,891 | 6/1974 | Wootten | 43/4 X |

Primary Examiner—Hugh R. Chamblee
Assistant Examiner—Daniel J. Leach

[57] ABSTRACT

An inflatable, cone shaped plug for an ice fishing hole composed of flexible material and made in two concentric, elongated compartments, the inner compartment having a cylindrical shape is inflated first to give rigidity for inserting in the hole, the outer compartment having a flared top and a cone shaped main body extending beyond the bottom of the hole to provide a wide view when the ice increases in thickness, is deflated before the plug is removed.

5 Claims, 3 Drawing Figures

ICE FISHING HOLE PLUG

This invention relates to ice fishing and has to do with a plug means for preventing a hole, which is used for fishing through the ice, from freezing shut.

An object of the invention is to provide a novel cylindrical plug for inserting in the ice hole and having double, inflatable chambers.

Another object of the invention is to design a plug which will prevent loss of view through the hole as the bed of ice increases in thickness.

The objects and advantages of the invention will become apparent from the following description and drawings which illustrate certain embodiments of the invention.

In ice fishing, it is customary to drill a hole in the ice to suspend a line, hook, bait or lure therethrough. Whether the hole is in the open or in a fish house, it tends to become frozen shut. Also, as the ice thickens the view through the hole may become obscured. An ordinary straight plug tends to freeze in the ice making it difficult to remove and the view through the hole becomes confined as the ice increases in thickness.

In accordance with the present invention, a flexible, cylindrical tube is inserted in the hole and the tube inflated. The tube has double compartments whereby one compartment, smaller than the hole is inflated first to give rigidity to the tube for inserting in the hole, and then the other compartment is inflated to fill the hole. The tube is generally cone shaped when inflated and is inserted in the hole so that the circular base extends through the hole into the water. The top of the cone is preferably flared or funnel shaped to prevent the plug from falling or being sucked through the hole. The inner compartment is preferably tubular in shape to facilitate inserting in the hole prior to inflating the outer compartment. The outer compartment is of such shape that when inflated it imparts to the body of the plug a cone shape and to the top a funnel shape. When the plug is placed in the hole, the midsection in contact with the ice assumes the cylindrical shape of the drilled hole, and the bottom section which extends into the water becomes cone shaped. As the layer of ice becomes thicker, the hole in the new ice coincides with the cone shape of the plug. The resulting cone shape of the bottom portion of the hole increases the dimension of the view through the hole of the water and of the lake bottom.

Figure 1:
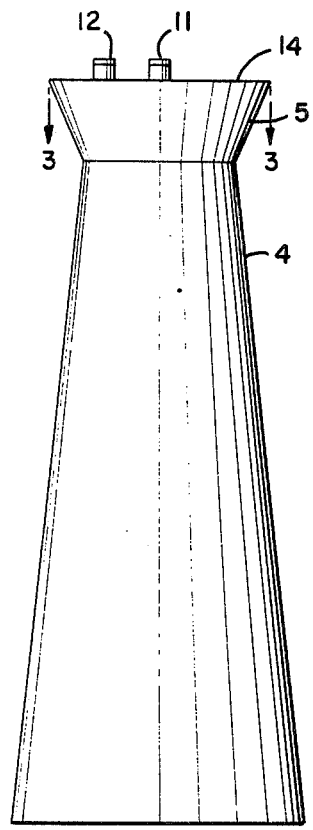
FIG. 1 is a side, vertical view of the plug when inflated.
Figure 3:
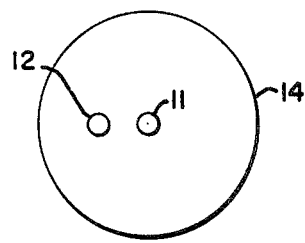
FIG. 3 is a top view along the line 3 — 3 of FIG. 1.
Figure 2:
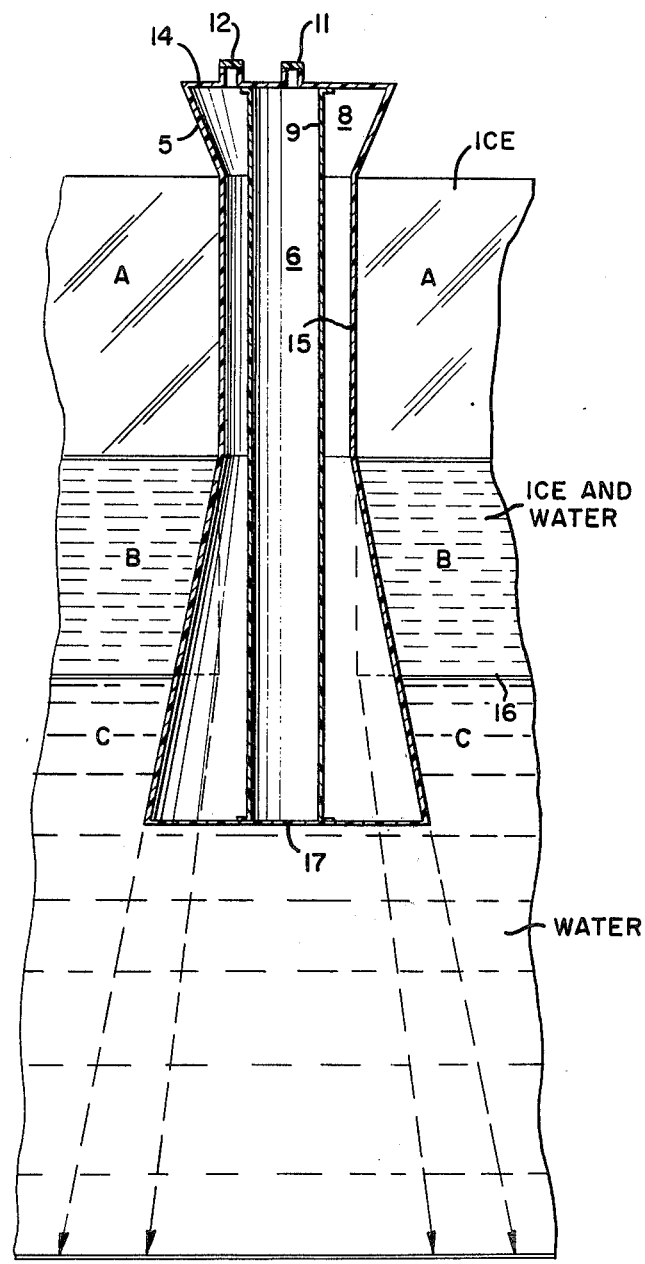
FIG. 2 is a vertical cross section showing the plug in place in the hole, the original thickness of the ice, the increased thickness after the plug is inserted and the expanded view due to the cone shaped hole.

The plug as shown in FIG. 1 is cone shaped over its major portion 4 and at the top is flared to form a funnel shape at the top portion 5, the purpose of the latter being to keep the plug from sliding through the hole. It will be observed from FIG. 2 that the plug is constructed in two compartments, inner and outer designated by the numerals 6 and 8, which are separated by a wall 9. The two compartments have valves 11 and 12 so that they can be separately inflated. FIG. 2 also shows a cross section of the ice in which the plug is inserted. The Area A indicates the original ice bed at the time the plug was installed. The Area B denotes the additional thickness of the ice bed accumulating after the plug was inserted. The Area C signifies the water under the ice, a portion of which may freeze to add to the thickness of the ice bed 16. The hole in the ice of Area A is substantially cylindrical in shape to which the plug has conformed even though the plug was originally cone shaped. The hole in the ice bed of Area B was formed after the plug was inserted and is cone shape to conform with the contour of the wall 15 of the plug. The lower section of the plug extends into the water of Area C to provide additional space around which future ice may form, such ice also conforming to the conical shape of the plug.

The plug may be made of any suitable, air tight, flexible material. The walls of the compartments may be of the same or different materials, such as polyvinyl chloride or polypropylene.

An advantage of the invention is in the cone shape imparted to the plug by the outer chamber 8. The plug will fit into any cylindrical hole drilled in the ice of variable thickness, and despite the conical shape of the plug it will conform to the shape of the hole. But as the ice layer increases in thickness the hole will assume the cone shape of the plug and thereby enlarge the perspective view of the water and the lake bed. This feature is illustrated by the lines projecting below the plug in FIG. 2. For example, if the diameter of the circular bottom end 17 of the plug is double the diameter of the inner tubular compartment, the view through the hole will be increased 50% when the ice areas A and B are of approximately the same thickness. The outer chamber 8 also has the advantage that it can be separately deflated thereby loosening the plug so that it can be easily removed while the inner chamber is still inflated.

For purposes of illustration, an example will be given of a plug which has been found useful. The plug was made of polyvinyl chloride and had an overall length of 2½ feet. The inner cylindrical compartment had a diameter of 3 inches. When inflated the circular bottom of the cone was 1 foot. The flared top portion had a height of 3 inches and the diameter at the top was 9 inches. The diameter of the neck of the cone at the junction with flared top was 6 inches.

In practicing the invention, the inner compartment of the plug was inflated and the plug inserted in the hole down to the flared end. At this stage the plug was considerably smaller than the hole. When the outer compartment was inflated the plug fitted snugly in the hole displacing all water and conforming to the cylindrical shape of the hole. The lower portion of the plug extended below the ice layer into the water and took the shape of a cone. The plug was inserted after fishing and was allowed to stand for a considerable length of time unused. When the plug was removed the ice layer had thickened extensively but the view through the longer hole was at least as large as that through the shorter hole in the original ice layer.

The embodiment of the invention shown in the drawings is for purposes of illustration. Many variations may be made in the details of construction without departing from the spirit of the invention. For example, without limiting the variations, parts of the plug are subject to reasonable alteration as desired. The shape and size of the flared end may vary as long as the function as described herein is retained. Also the main part of the plug need not be cone shaped over its entire length, but instead the portion which is inserted in the original ice layer may be the cylindrical shape of the hole as it assumes that shape anyway. All such variations and modifications are considered as coming within the scope of the invention.

I claim:

1. An inflatable ice hole plug comprising a flexible, airtight cone having two concentric compartments, an inner tubular section and an outer cone-shaped section surrounding said inner section, both compartments being separately inflatable to form an elongated conical shaped plug.

2. A device as described in claim 1 in which the pointed end of said cone is flared to form a funnel shaped stop to prevent the plug from passing through the hole.

3. A device as described in claim 1 in which said outer section surrounds the entire length of the inner section and the cone shaped portion surrounds at least a substantial length of the lower portion of said inner section.

4. The method of preventing a hole used for ice fishing from freezing shut during non-use which comprises inserting in the hole a flexible air-tight plug having two elongated concentric compartments, inflating the inner compartment to give rigidity to the plug for inserting in the hole, inflating the outer compartment to secure the plug in the hole, maintaining the plug in the hole during non-use and prior to reusing the hole deflating the outer compartment and removing the plug.

5. The method as described in claim 4 in which, when inflated, the inner compartment is an elongated cylindrical tube and the outer chamber is an elongated cone whereby the view through the hole is prevented from being restricted during non-use as the ice becomes thicker.

* * * * *